US006385461B1

(12) United States Patent
Raith

(10) Patent No.: US 6,385,461 B1
(45) Date of Patent: May 7, 2002

(54) USER GROUP INDICATION AND STATUS CHANGE IN RADIOCOMMUNICATIONS SYSTEMS

(75) Inventor: Alex Krister Raith, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/192,185

(22) Filed: Nov. 16, 1998

(51) Int. Cl.[7] .................................................. H04Q 7/20

(52) U.S. Cl. ........................ 455/518; 455/519; 455/466; 455/566; 455/567

(58) Field of Search ................................ 455/518, 519, 455/416, 466, 566, 567, 557, 556, 31.3, 38.2, 38.4; 340/825.44

(56) References Cited

U.S. PATENT DOCUMENTS

| | | | | |
|---|---|---|---|---|
| 5,404,355 A | | 4/1995 | Raith | 370/95.1 |
| 5,530,914 A | * | 6/1996 | McPheters | 455/518 |
| 5,634,197 A | | 5/1997 | Paavonen | |
| 5,666,364 A | | 9/1997 | Pierce et al. | |
| 5,694,393 A | | 12/1997 | Kaye | |
| 5,752,196 A | | 5/1998 | Ahvenainen et al. | |
| 5,758,279 A | * | 5/1998 | Foti | 455/412 |
| 5,809,018 A | * | 9/1998 | Lehmusto | 370/330 |
| 5,842,136 A | * | 11/1998 | Tuulos | 455/519 |
| 5,970,417 A | * | 10/1999 | Toyryla et al. | 455/519 |
| 5,999,820 A | * | 12/1999 | Sutanto et al. | 455/508 |
| 6,005,848 A | * | 12/1999 | Grube et al. | 370/366 |
| 6,009,308 A | * | 12/1999 | Matsuura | 455/31.3 |
| 6,026,296 A | * | 2/2000 | Sander, III et al. | 455/426 |
| 6,032,051 A | * | 2/2000 | Hall et al. | 455/518 |
| 6,097,963 A | * | 8/2000 | Boltz et al. | 455/518 |
| 6,119,017 A | * | 9/2000 | Cassidy et al. | 455/518 |
| 6,185,430 B1 | * | 2/2001 | Yee et al. | 455/519 |
| 6,188,882 B1 | * | 2/2001 | Tarkiainen et al. | 455/404 |
| 6,253,091 B1 | * | 6/2001 | Naddell et al. | 455/519 |

FOREIGN PATENT DOCUMENTS

| | | |
|---|---|---|
| EP | 0780819 A2 | 12/1996 |
| WO | 94/14289 | 6/1994 |
| WO | 98/49856 | 11/1998 |
| WO | 99/03253 | 1/1999 |

* cited by examiner

*Primary Examiner*—Vivian Chang
*Assistant Examiner*—Duc Nguyen
(74) *Attorney, Agent, or Firm*—Burns, Doane, Swecker & Mathis, L.L.P.

(57) ABSTRACT

The present invention sets forth group call services which uses broadcast or point-to-point radiocommunication resources to provide information to a mobile station user. First, indications of existing group calls are transmitted to mobile stations. Then, users of mobile stations are alerted to the existence of relevant group calls, i.e., those calls in which they are eligible to participate.

64 Claims, 3 Drawing Sheets

USER GROUP INDICATION AND STATUS CHANGE IN RADIOCOMMUNICATIONS SYSTEMS

BACKGROUND

The present invention relates generally to the provision of information services in radiocommunication systems and, more particularly, to efficiently providing user group functionality services in conjunction with existing radiocommunication services and systems.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. In addition to a commercial demand for increased capacity and quality of service, these trends also suggest a demand for an increase in the types of services provided by radiocommunication systems.

As users become more accustomed to using radiocommunication devices, their expectations regarding the capabilities of these devices also grows. For example, many users expect, or will come to expect, that cellular telephones should provide at least the same types of service that are provided by conventional, land-line telephone systems. One example of a popular landline based service which Applicant also anticipates will be widely desired by radiocommunication device users is the so-called conference or group call, wherein a plurality of users having different terminals are connected together and able to transmit and receive to all of the other active members of the group.

To implement group call functionality in radiocommunication systems, a user group identification (UGID) code is assigned to each of a number of different subsets of mobile stations. Consider the conceptual example depicted in FIG. 1. Therein, a plurality of mobile stations (MS) 10 are logged-in, i.e., powered on, registered with the system using the system's registration procedure and listening to a control channel, via respective base stations (BS) 30. MS 20 is not currently logged-in this example, e.g., MS 20 is powered off. Each mobile station in this example belongs to one of user groups 1, 2 or 3 (although those skilled in the art will appreciate that mobile stations can, of course, belong to multiple user groups or no user groups). When a call is requested for a particular user group, a page message is transmitted from the system in areas where users in this particular group have registered. In the example of FIG. 1, suppose that a user group call is requested for UGID=1. Then, the page message includes the UGID for this particular user group, such that mobile stations which are not in this particular user group ignore the page message. For example, the MSs having UGID=2 or 3 in FIG. 1 would ignore this particular paging message.

For mobile stations that receive the page which are within this particular user group, an indication is generated at the mobile station to inform the user that he or she has received a group call page. This indication can, for example, take the form of a tone generated by the mobile station. If the user acknowledges the page, then a page response message is transmitted to the system. Finally, a channel assignment for the group call is granted to the responding mobile stations within the group of interest.

One problem associated with this group call service is that some mobile stations which support users within the relevant user group will not inform their respective users of the group call. This may occur for several reasons, e.g., the mobile stations may not be logged-in to receive the page, the mobile station may not be within the service area where pages are delivered, or the mobile stations may be logged-in but the user may not be in the proximity of the unit to receive an alert. Since these pages may not be repeated by the system, these users may miss their opportunity to join the group call. Using the above example, MS 20 in FIG. 1 will not receive the page for the group call associated with UGID=1 and, if it logs in to the system during the group call, has no way of informing its user of the existence of this call.

Accordingly, it would be desirable to provide techniques and systems for providing an indication of which user groups currently have established group calls in radiocommunication systems to avoid the problem wherein an uninformed user is loses an opportunity to access an ongoing user group call. Moreover, it would further be desirable to provide group users and group managers with additional information related to group calls to enhance this valuable service.

SUMMARY

Exemplary embodiments of the present invention provide techniques which support user group functionality in a manner which provides individual users with the opportunity (and information needed)to join group calls at any time. One exemplary embodiment of the present invention transmits information regarding active user group connections on a broadcast channel, i.e., a point-to-multipoint resource. In this way a mobile station can update its information regarding active user groups by listening to the broadcast channel, e.g., after power-on. The mobile station can then provide an indication to its user regarding active user groups of interest and the user can determine whether or not to join the active user group connection.

According to another exemplary embodiment of the present invention, the indication regarding the existence of an active user group call can be provided on a point-to-point channel rather than a broadcast channel. Examples of point-to-point implementations of the present invention include providing active user group call indications along with registration responses from the system, or using short message service (SMS) functionality.

In addition to providing an indicator of which user groups (if any) have active group calls, exemplary embodiments of the present invention provide for the transmission and reception of auxiliary information which better enables the recipient to understand the nature of the active group call. For example, this auxiliary information may include one or more of the number of users in the group currently connected, the elapsed time of the group call, the identity of users participating in the group call, information regarding the topic of the group call, as well as other types of information described below.

Still other exemplary embodiments of the present invention relate to the terminals or mobile stations which are adapted to use the group call information transmitted by the system. Such terminals or mobile stations according to the present invention provide various types of alerts for informing users of established group calls, as well as providing the user with the auxiliary information described above. In some exemplary embodiments, the user can selectively enable different alerts to be used to inform him or her of the existence of a group call based on a priority level of the call.

Yet other exemplary embodiments of the present invention focus on management of group call information. Each user group may have some particular central management facility which can participate in coordinating communication within the group. This facility can cooperate with the radiocommunication system to adjust, for example, the types and values of the auxiliary information transmitted to the users within the group.

BRIEF DESCRIPTION OF THE DRAWINGS

The above objects and features of the present invention will be more apparent from the following description of the exemplary embodiments with reference to the accompanying drawings, wherein.

DETAILED DESCRIPTION

The following description is written in terms of a cellular radiotelephone system, but it will be understood that Applicant's invention is not limited to that environment. More specifically, the following description is written using terms which may be associated with TIA/EIA 136 compliant systems, but it will be understood by those skilled in the art that the present invention may be implemented in other communication applications including those which are designed in accordance with other standards, e.g., GSM, IS-95 or PDC, as well as those which use other access methodologies, e.g., CDMA.

Figure 1:
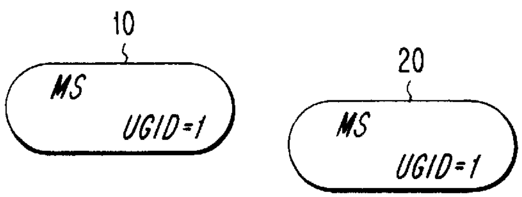
FIG. 1 illustrates a plurality of different mobile stations associated with different user groups in a radiocommunication system.
Figure 1:
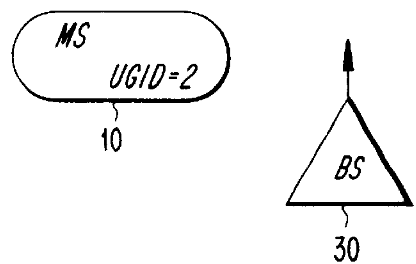
Figure 1:
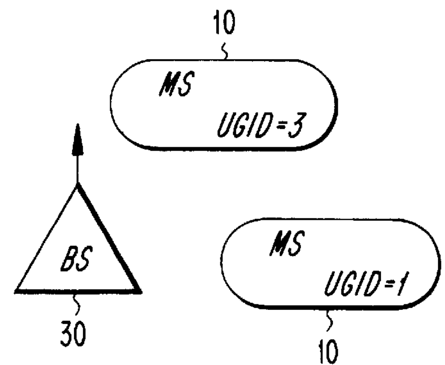
Figure 1:
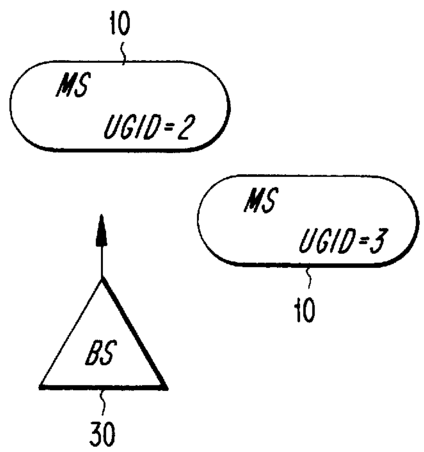
Figure 2:
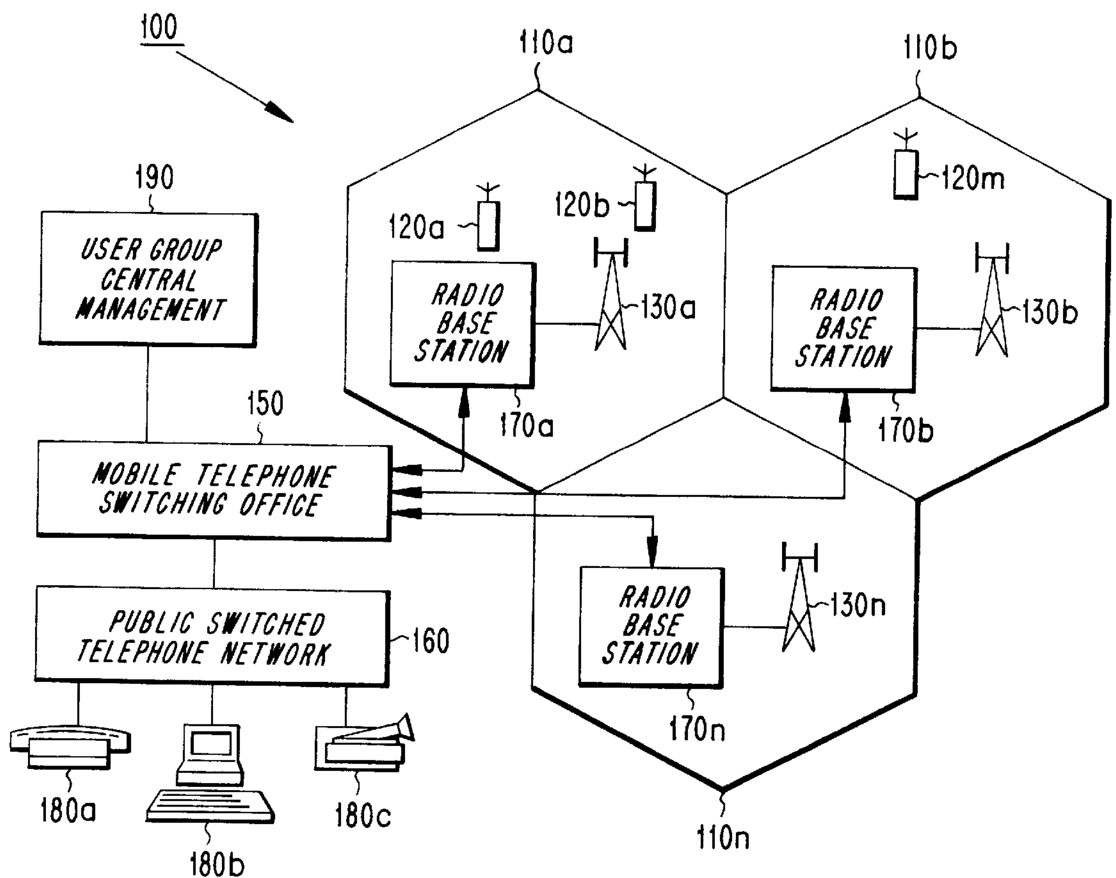
FIG. 2 illustrates an exemplary radiotelephone system into which the present invention may be implemented.

FIG. 2 illustrates an example of a conventional cellular radio communication system 100 in which exemplary embodiments of the present invention can be applied. The radio communication system 100 includes a plurality of radio base stations 170*a–n* connected to a plurality of corresponding antennas 130*a–n*. The radio base stations 170*a–n* in conjunction with the antennas 130*a–n* communicate with a plurality of mobile terminals (e.g. terminals 120*a*, 120*b* and 120*m*) within a plurality of cells 110*a–n* using, for example, digital control channels (DCCHs) and digital traffic channels (DTCs) to communicate voice, data or other types of information. Communication from a base station to a mobile terminal is referred to as the downlink, whereas communication from a mobile terminal to the base station is referred to as the uplink.

The base stations are connected to a mobile telephone switching office (MSC) 150. Among other tasks, the MSC coordinates the activities of the base stations, e.g., during group calls. The MSC, in turn, can be connected to a public switched telephone network (PSTN) 160, which services various landline connected communication devices 180*a*, 180*b* and 180*c*. Additionally, the system may include, or be connected to, one or more user group central management units 190, whose operation and functionalities are described in more detail below.

These nodes within the system 100 can be used to set-up group calls between responding, logged-in mobile stations using known techniques. From an air interface resource perspective, a group call can be set-up by assigning each participating group member to a traffic channel and coordinating the group functionality within the system. Alternatively, at least for the downlink, a group call can be established by allocating a common channel to be received by all participating members of the group.

A group call can be coordinated between participating members of the group in a variety of ways. Initially, the system will receive a request from a communication device, either associated with the PSTN (e.g,. one of devices 180*a*, 180*b* or 180*c*) or with the radio portion of the system (e.g., one of mobile stations 120*a*, 120*b* or 120*m*), to initiate a group call associated with a particular UGID. The system will then identify which logged-in mobile station(s) are members of that particular user group. For instance, a mobile station may be preregistered for user group operation within one or more specific user groups as a result of its service subscription in its home MSC.

When an MSC receives a registration wherein the mobile subscriber is requesting that the mobile station be included in calls directed to a specific user group, the serving MSC can contact the home MSC to determine whether or not the requesting mobile station is allowed to participate in this particular user group. The home MSC informs the visited MSC of the home MSC's decision to either approve or deny service for the requested user group. If the home MSC decides to approve the request, the serving MSC sends back a registration acceptance message to the requesting mobile station. If the mobile station does not receive a registration accept message, the mobile station will know that its request has been denied and will not activate user group operation for that user group.

This type of procedure will enable the radiocommunication system to page the logged-in mobile stations associated with a particular group when a request for a group call is received. In order to send messages to distinct user groups, a user group identity field (UGID) can be included in the page message, e.g., in the SPACH layer 2 protocol of the EIA/TIA 136 standard. By using this group identity, the communication system can page the entire user group in any given paging area by sending only one page message.

Exemplary embodiments of the present invention extend the functionality of group calls as applied to radiocommunication systems in a number of different ways. First described are embodiments of the present invention which provide users with an indication that a group call has been established, which permits non-participating group members with an opportunity to selectively decide to join the group call. This feature of exemplary embodiments of the present invention is particularly useful for permitting recently logged-in mobile stations to inform their users of the existence of a group call in which he or she might be interested in participating, as well as to provide users returning to their already logged-in mobile station with the same opportunity.

Using a Broadcast Channel to Inform Users of Group Calls

According to an exemplary implementation of the present invention an indicator of established group calls(s) is transmitted by the radiocommunication system on a broadcast channel, e.g., a time multiplexed channel within a control channel that every mobile station which is camped (i.e., logged-in) on a particular control channel is listening to. Most commonly found cellular systems, e.g., GSM, IS-136, IS-95 and PDC have a broadcast channel, often referred to as the BCCH. According to one exemplary embodiment of the present invention, the indicator of established group calls can include transmitting, on the BCCH, the UGIDs of those groups which have established group calls. There are, however, a number of different, exemplary techniques by which the mobile station can obtain this broadcast information and use it to determine whether to inform the user of the existence of a group call.

For example, a dedicated user group change flag (UGCF) can be provided on the paging channel (e.g., another time or code multiplexed channel which may be found on the control channel in addition to the BCCH). The paging channel is typically the only channel read by a mobile station while in standby (sleep) mode. In the assigned paging channel, i.e., one assigned timeslot out of a number of available timeslots, two change flags are currently defined in the ANSI 136 standard, which flags inform mobile stations whether there have been any changes in the broadcast information on different broadcast resources (specifically, one change flag for the S-BCCH and one for the E-BCCH and the F-BCCH). These flags allow mobile stations to avoid having to reread all of the available information if there have been no changes. Thus, a new UGCF could be added so that mobile stations don't read the UGIDs being transmitted on the BCCH if they haven't changed since the last reading cycle. In this way, the mobile station conserves battery power by limiting its reading of the transmitted UGIDs. The interested reader is directed to U.S. Pat. No. 5,404,355 for more information on change flags, the disclosure of which is expressly incorporated here by reference. Moreover, if the UGCF contains additional information, e.g., identifying which group(s) or range of groups have new group call information on the BCCH, this will aid mobiles in determining whether the changed information is of interest to them, i.e., to avoid the case where a special group, that is constantly establishing group calls for which only a small subset of mobile stations are interested, drives all mobile stations to read the BCCH.

Alternatively, if no dedicated UGCF is provided and if, for example, the user group call information is provided as a channel within the S-BCCH, then the mobile station could check the existing change flag associated therewith. In this case, the mobile would re-read the transmitted UGIDs whenever a change was indicated for the S-BCCH.

If the user group information does not have a dedicated change flag on the paging channel and it is not coupled to the S-BCCH change flag (or E-BCCH/F-BCCH change flag, then the mobile station may instead perform periodic updates of the broadcast user group information. For example, the mobile station may acquire the established group call information when it logs-in to the system and then, re-read the portion of the BCCH containing the transmitted UGIDs periodically to update its information pertaining to established user group calls. Alternatively, the BCCH could itself contain a UGID change flag which the mobile station could periodically read prior to selectively reading all of the transmitted UGID information.

Yet another mechanism for obtaining user group call information from a broadcast resource according to the present invention, empowers the user to trigger the mobile station to read the broadcast resource containing the indicator(s) of established user group calls. For example, the user can be provided with a user selectable menu option, a sequence of keypad entries ("#*#54"), etc., which action by the user commands the mobile station to display or otherwise output the established group calls associated with that user's UGID. The mobile station may then refresh or update its knowledge of the established group calls in any of the manners described above, e.g., by reading the broadcast channel containing the user group call information in response to the user's request, checking the UGCF (in the paging channel or in the BCCH), checking the S-BCCH change flag, etc. This same mechanism can provide the user with the option of requesting additional information about ongoing group calls, e.g., the identity of participating group members.

Thus, a mobile station which is camped on a control channel and able to listen to the BCCH may then learn about the existence of ongoing group calls. However, prior to notifying or informing the user (described more below) about the existence of such calls, the mobile station can compare the UGIDs broadcast on the control channel with one or more UGIDs stored in a memory device (not shown) of the mobile station. The stored UGIDs correspond to those user groups to which the user of the mobile station belongs. Since different users may, at different times, use the same mobile station equipment, it is also possible to have different UGID lists associated with different users. Then, the mobile station can compare the received UGIDs from the broadcast channel with the UGID list associated with the current user of the mobile station or with all of the UGID lists stored therein.

The mobile station can recognize the appropriate UGID(s) for comparison, i.e., those associated with the current user of the mobile station, in a number of different ways. For example, the user may be prompted to enter his or her UGID(s) into the mobile station when he or she powers on the mobile station and/or logs-in to the system. Alternatively, some mobile stations employ removable smart cards which contain various information elements associated with a user, e.g., his or her preferences for mobile station operation, encryption key(s), UGID(s), sub-UGID (s), etc. When the user inserts his or her smart card into the mobile station, the mobile station will then recognize the relevant UGID(s)/sub-UGID(s) for identifying relevant group calls for the purpose of informing the current user of the mobile station. As a third alternative, the user may enter some other number, e.g., an employee number, into the mobile station, which number can then be mapped to a stored UGID list.

In any event, if the UGID comparison results in a match, then the mobile station can inform the user of the existence of the group call. Informing the user (and the manner in which this is accomplished) may be further conditioned or varied based upon the priority level of the group call, if provided as auxiliary information (described below), or other user selectable/programmable criteria.

In addition to the UGIDs, there may be auxiliary information transmitted together with the indicator which can be used by the receiving mobile stations and/or users in handling the existence of a relevant group call. This auxiliary information can include, for example:

- a number of participating members associated with a group call;
- identities (e.g., names) of the participating group call members;
- a priority or importance level of a group call, which level may have been set by one of the participating members, e.g., the person who initiated the call, or a group manager as described below;
- a time elapsed since the group call started;
- a request or priority level to all non-participating group members to join the group call;
- a group call identifier (i.e., a sub ID of a UGID), since there may be several group calls established at one time for the same group, this identifier can be used to permit the user to select which particular call within the group he or she would prefer to be connected to;
- a name of the group and sub-groups (e.g., Durham Police—North).

Those skilled in the art will appreciate that the foregoing are merely examples of the types of auxiliary information which can be transmitted along with, or instead of, an indicator associated with the existence of an established group call and that other types of information may also be transmitted.

If desired, the indicator (as well as the auxiliary information) may be encrypted (or scrambled) such that only group members (of a particular group) can read this messages. Alternatively, the indicator (and/or the auxiliary information) may be transmitted in an unencrypted form. If encrypted, the mobile station will apply the appropriate decryption key to read this information. Various mechanisms for supplying the proper decryption key to the mobile station, e.g., downloading the key over the radiocommunication system's air interface or from a personal computer, inputting the key via the mobile station's keypad and providing the key in the mobile station's removable smart card (e.g., SIM card), etc. can be used. Those readers interested in obtaining more information regarding the implementation of encryption techniques to broadcast information in radiocommunication systems are directed to U.S. patent application Ser. No. 09/132,232, entitled "Broadcast Access Service Control", filed on Aug. 11, 1998 to Applicant, the disclosure of which is expressly incorporated here by reference.

Using a Point-to-Point Channel to Inform Users of Group Calls

According to a second exemplary embodiment of the present invention, the information described above (i.e,. the indicator and/or the auxiliary information) is sent to the mobile station as a point-to-point message. One mechanism for transmitting this information as a point-to-point message is when the mobile performs a registration to the system. In cellular systems, the system responds to a registration by the mobile station with an acknowledgment message or signal indicating either that the mobile is considered logged-in or that its registration request is rejected. If the mobile is accepted, the Home Location Register (HLR), a database used to track the whereabouts of the mobile, is typically informed. Often the registration is accompanied by an authentication of the mobile station.

According to this exemplary embodiment of the present invention, the Registration Response message can contain the information (i.e, the indicator and/or the auxiliary information described above) about established group calls for which the mobile is eligible to participate in. For example, in radiocommunication systems which are compliant with the TIA/EIA 136 standard, the Registration Response message includes an optional Display information element which can carry the information associated with the established group call(s), i.e., the indicator and/or the auxiliary information. The information contained in this element, when received, will be displayed on the screen of the mobile station. Of course, those skilled in the art will appreciate that other types of messages could be used to carry this established user group call information.

In this exemplary embodiment, since a targeted point-to-point message is used to convey information to the mobile station regarding the existence of group calls, the system can perform the comparison described above for the broadcast channel exemplary embodiment. That is, the system can obtain the UGID(s) associated with this particular user's subscription and compare these UGID(s) with those associated with any existing group calls. If a match occurs, then the system can include the information associated with such group calls as part of the registration response message.

Another alternative to using the registration mechanism for sending the group call information is to use the point-to-point Short Message Service (SMS). SMS services are conventionally used to transmit short text messages to mobile stations which are displayed on the screens or otherwise output (e.g., by translating the text message into synthesized voice which is output via the mobile station's speaker) by the mobile stations. All cellular standards currently support the SMS service. The group call information described above could be transmitted to the mobile station using the SMS service at any desired time. For example, this option can be triggered when the mobile arrives in a cell or when powering up to inform the user of relevant group calls. Alternatively, the user could request an update regarding established user group calls whereupon the mobile station could transmit an SMS message requesting relevant UGIDs and, optionally, some or all of the auxiliary information described above.

User Group Central Management

Group calls can be coordinated by an adjunct system which is part of, or connected to the radiocommunication system. For example, when the mobile's presence is recognized by the radiocommunication system, the system may forward this information to a user group central management (UGCM) unit 190, e.g., at a police station. The UGCM 190 operates to coordinate information and activities associated with group calls. For example, unit 190 can be used to monitor existing group calls (for a particular group, e.g., Durham Police), as well as track the status of members of the group which are stored in a local database.

The group operator in the group center may, depending on the circumstances, issue a request to a particular wireless user to enter the group call, e.g., by issuing an SMS message as relayed by the radiocommunication system to which the UGCM unit 190 is connected. The UGCM unit 190 can, of course, also dial the number directly to the wireless user and thereby enter the user into the group call. The dialed number may be related to the normal cellular identifier (e.g., MIN or IMSI). Depending on the particular cellular standard, a mobile may or may not be responsive to both its MIN/IMSI or UGID at this point. The group manager uses the appropriate number to address the user.

The UGCM 190 can acquire its knowledge of logged-in users in a number of different ways. For example, the HLR can inform the UGCM 190 when a group member (i.e, a user having an appropriate UGID) registers with the system 100. Alternatively, the UGCM 190 may periodically poll the HLR to determine if new group members have recently logged-in.

The UGCM 190 can also acquire mobile station position information to provide a map display by which a group operator can more readily coordinate group call activity. Radiocommunication systems are now beginning to require that operators be able to locate mobile stations, e.g., to service emergency (911) calls. Various techniques can be used to locate mobile stations, e.g, triangulation on received signals by the base stations or other adjunct, fixed equipment, GPS devices in the mobile stations, etc. For more information on various techniques and implementations for locating mobile stations in radiocommunication systems, the interested reader is directed to U.S. patent application Ser. No. 08/839,861 entitled "Interaction between Adjunct Positioning System and Radiocommunication Systems" to Raith et al., and U.S. patent application Ser. No. 08/838,027 entitled "A Cellular Positioning System that Compensates for Received Signal Delays in Positioning Radio Receivers" to Ramesh et al., both of which were filed on Apr. 22, 1997 and both of which are expressly incorporated here by reference.

Assuming that radiocommunication system 100 and/or the mobile stations 120 are capable of providing location information, this information can be provided to the UGCM unit 190 in a variety of ways. For example, the system can regularly update UGCM 190 regarding the position of logged-in mobile stations associated with its relevant user group(s) which it acquires using one of the known techniques described in the aforementioned patent applicaitons. Alternatively, the mobile station could send its location directly to UGCM 190 if it obtains its own location information, e.g, via GPS. In this way, the UGCM's usage of positioning information would then be transparent to radiocommunication system 100. As yet another alternative, the system could receive the position information from each mobile 120 and forward that information to the UGCM 190 when polled.

Type of User Alert Signal

As described above, Applicant envisions that exemplary embodiments of the present invention include mobile stations (or other radiocommunication devices) that alert a user responsive to receipt of information associated with an existing group call which the user may join. Some exemplary embodiments will provide this alert using the mobile stations' existing displays. The information may simply be displayed as it is received over the broadcast or point-to-point channel. Alternatively, the mobile station may have stored information which maps UGIDs (and sub-UGIDs) to the name of the group (or sub-group). The text based name may then be retrieved from memory and displayed instead of the UGID actually received by the mobile station. Other mappings are also possible for certain auxiliary information.

Consider the following examples wherein a user group is the Durham Police. This group has several sub-groups. Auxiliary information transmitted along with the UGID/SUBUGID includes location, subject and status associated with the group call. The information displayed at a group user's mobile station (for this example) may then appear as follows:

Durham Police—North
Location: 122 Twisty Road
Subject: Road Accident
Status: Under Control Durham Police—North
Location: 4101 Wedded Bliss Lane
Subject: Domestic Violence
Status: Send Backup Durham Police—South
Location: Pleasant Valley
Subject: Sport Event
Status: please redirect traffic to Jump road exit, local officers please dial in.

In addition to (or as an alternative to) displaying the status of relevant group calls on a screen of the mobile station, the mobile station's response to a received group call indication can include other outputs, e.g, an audible alert signal, activation of a vibrator or a voice alert (e.g., based on a prestored synthesized voice alert or a text-to-voice conversion of some of the received text information). For this to be possible, the Display information element described above as an exemplary implementation may not be sufficient since the text-based information carried therein is transparent to the mobile device.

Accordingly, an additional, specially defined information element can be provided whose reception triggers the other output device(s) to inform the user of the existence of a relevant group call(s). Some existing radiocommunication technology may provide the ability for a user to request his or her mobile station to output an alert when an SMS message is received, although the currently defined Display information element in the TIA/EIA 136 standard is not typically accompanied by an alert signal. For the BCCH case, as described above, the mobile station may be set to alert the user when one or more of its UGIDs are present.

It is further desirable to provide the user with control over the mechanisms by which the mobile station alerts the user of the existence of a relevant group call. For example, the user should be able to enable/disable the provision of an alert, as well as enable/disable the type of alert if the mobile station supports multiple alerting options. Thus, a user may select (e.g., using the keyboard) that, when his or her mobile unit is powered on, receipt of information regarding a relevant, active group call results in a display alert, an audible alert (sound effect or voice) or a vibration alert. Alternatively, any two or more of these output forms could be combined. This preference may also be stored in the smart card.

To provide even greater flexibility, the user may tie the alert type to the priority of the group call. For example, a user could program his or her mobile station to output a display only alert if the group call has a low priority, a display and vibrate alert if the group call has a mid-level priority and a display/vibrate/audible alert for high priority group calls.

Alternatively, different sound effects could correspond to different levels of priority so that a user could audibly determine the importance associated with the opportunity to join a call. For example, if the UGCM 190 transmits auxiliary information associated with the subject of the group call and the user group has predefined subject categories, the user of a particular mobile station could associate the received subject information to a particular sound effect using menu selections or other user programming techniques of the mobile station. In this way, he or she would know the subject being discussed on the group call without having to read the display or join the call simply by identifying the specific sound effect generated by the mobile station as the alert.

Indications About Members Joining to or Terminating from a Group Call

When a new member joins an established group call, the system sends an indication to the already participating members informing them that a new member has joined. This can be a simple alert signal or can contain identifying text (e.g., the name) associated with the newly participating member.

The identifying text can be create as follows. When accessing the system, the mobile station typically sends a numerical identifier (e.g., MIN and/or IMSI) thereto. When added to a group call, the system 100 or UGCM 190 may translate the numerical identifier of the newly participating member into a user name through its subscription data base. Then, the system can forward the identifying text (or a numerical identifier that is mapped into text by the mobile stations) to the participating members for display on their terminal screens. When a member terminates its participation in the group call, similar information as that described above for newly added members can be provided to the remaining participants.

Figure 3:
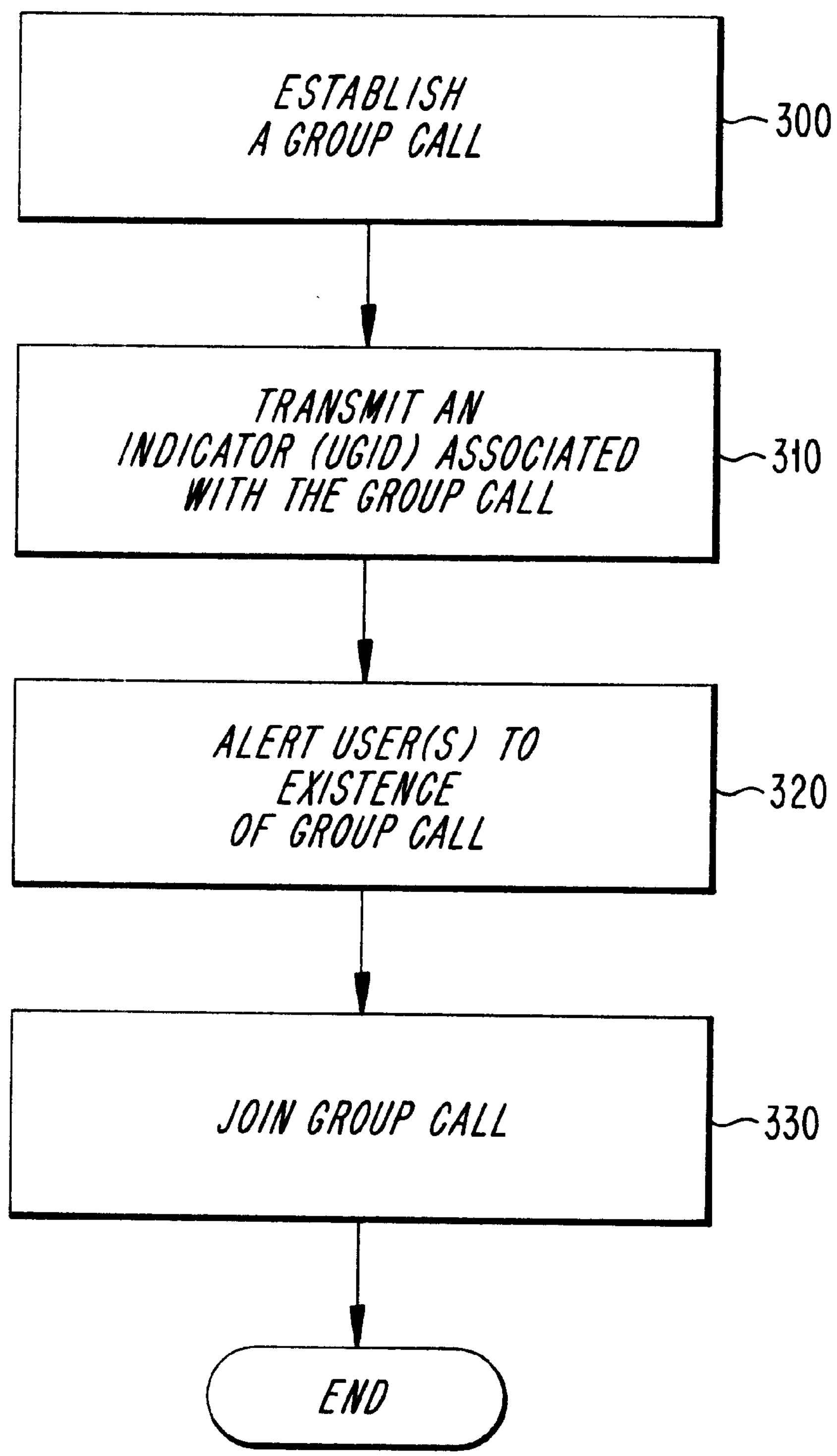
FIG. 3 is a flowchart depicting an exemplary method according to the present invention.

To summarize various aspects of the present invention, consider the flowchart of FIG. 3 which depicts an exemplary method for handling group calls according to the present invention. Therein, at step 300, a group call is established, e.g., using the paging technique described above. Then, at step 310, an indication is transmitted indicating the existence of the group call, which indication may include the corresponding UGID and, optionally, other descriptive auxiliary information. This information can be transmitted using a broadcast resource (i.e., point-to-multipoint) or a directed resource (i.e., point-to-point). Next, at step 320, an alert is generated to inform the user based on any of the foregoing techniques. Finally, at step 330, an informed user may opt to join the identified group call.

While the present invention has been described with respect to certain exemplary embodiments, one skilled in the art will appreciate that the invention would equally apply to other such systems. Many variants and combinations of the techniques taught above may be devised by a person skilled in the art without departing from the spirit or scope of the invention as described by the following claims.

What is claimed is:

1. A method for communicating in a system which supports group calls associated with a user group, said method comprising the steps of:

transmitting an indicator of an established group call; and providing one or more auxiliary information elements with said indicator to a member terminal associated with said user group, wherein characterizing information associated with said one or more auxiliary information elements is available to a user of said user group for previewing said established group call before said user engages in said established group call, and wherein said characterizing information includes at least a topic of said established group call that enables said user to preview a subject of said established group call before said user engages in said established group call.

2. The method of claim 1, further comprising the step of:

encrypting said indicator such that only member terminals associated with said user group can decode said indicator.

3. The method of claim 1, further comprising the step of:

encrypting said one or more auxiliary information elements such that only member terminals associated with said user group can decode said one or more auxiliary information elements.

4. The method of claim 3, wherein said one or more auxiliary information elements are associated with at least one of: a number of active member terminals currently connected to said established group call, a user identity, an identity associated with each of said active member terminals currently connected to said established group call, a priority level of said established group call, a time since said established group call was initiated, an urgency level associated with unconnected members joining said established group call, a user group identifier associated with said established group call, and a user sub-group identifier associated with said established group call.

5. The method of claim 1, further comprising the steps of:

reading said indicator at a member terminal;

comparing a user group identity associated with said indicator to at least one stored user group identity associated with a user identity associated with one or more users of said member terminal; and presenting a result of said comparing step.

6. The method of claim 5, wherein said step of presenting further comprises the step of:

displaying said one or more auxiliary information elements associated with said user group on a display associated with said member terminal.

7. The method of claim 5, wherein said step of presenting further comprises the step of:

triggering a vibrating device associated with said member terminal.

8. The method of claim 5, wherein said step of presenting further comprises the step of:

emitting an audible alert from said member terminal indicating an opportunity for said member terminal to join said established group call.

9. The method of claim 5, further comprising the step of:

inputting a request at said member terminal to participate in said established group call; and transmitting a signal from said member terminal requesting participation in said established group call.

10. The method of claim 1, wherein said indicator is transmitted on a point-to-point channel.

11. The method of claim 10, wherein said indicator is transmitted as part of a registration response message on said point-to-point channel.

12. The method of claim 1, wherein said indicator is transmitted on a broadcast channel.

13. The method of claim 1, wherein said indicator is transmitted as part of a short message service (SMS) message on said point-to-point channel.

14. A method for communicating in a system which supports group calls associated with a user group, said method comprising the steps of:

receiving an indication and one or more auxiliary information elements associated with an established group call at a member terminal; and presenting said indication and said one or more auxiliary information elements at said member terminal if said member terminal is associated with said user group, wherein characterizing information associated with said one or more auxiliary information elements is available to a user of said user group for previewing said established group call before said user engages in said established group call, and wherein said characterizing information includes at least a topic of said established group call that enables said user to preview a subject of said established group call before said user engages in said established group call.

15. The method of claim 14, wherein said step of presenting said indicating further comprises the step of:

presenting an alert signal to said member terminal to join said established group call if said member terminal is associated with said user group.

16. The method of claim 14, wherein said one or more auxiliary information elements are associated with at least one of: a number of active member terminals currently connected to said established group call, a user identity, an identity associated with each of said active member terminals currently connected to said established group call, a priority level of said established group call, a time since said established group call was initiated, an urgency level associated with unconnected members joining said established group call, a user group identifier associated with said established group call, and a user sub-group identifier associated with said established group call.

17. The method of claim 16, wherein said identity is a name.

18. A method for communicating in a system which supports group calls associated with a user group, said method comprising the steps of:

transmitting an indication to active member terminals associated with an established group call that a member terminal is changing participation in said established group call; and providing one or more auxiliary information elements with said indication, said one or more auxiliary information elements associated with said established group call, to said active member terminals, wherein characterizing information associated with said one or more auxiliary information elements is available to a user of said user group for previewing said established group call before said user engages in said established group call, and wherein said characterizing information includes at least a topic of said established group call that enables said user to preview a subject of said established group call before said user engages in said established group call.

19. The method of claim 18, wherein said step of transmitting an indication further comprises the step of:

transmitting an alert signal to said active member terminals over at least one channel used to establish said group call.

20. The method of claim 19, wherein said one or more auxiliary information elements are associated with at least one of: a number of active member terminals currently connected to said established group call, a user identity, an identity associated with each of said active member terminals currently connected to said established group call, a priority level of said established group call, a time since said established group call was initiated, an urgency level associated with unconnected members joining said established group call, a user group identifier associated with said established group call, and a user sub-group identifier associated with said established group call.

21. The method of claim 18, wherein said indication of changing participation further includes said member terminal joining said established group call.

22. The method of claim 18, wherein said indication of changing participation further includes said member terminal leaving said established group call.

23. A mobile station for communicating in a system which supports group calls associated with a user group, said mobile station comprising:

a smart card removably coupled to said mobile station;

an input device coupled to said mobile station;

an output device coupled to said mobile station; and a transceiver coupled to said mobile station, said transceiver for transmitting and receiving radio signals;

wherein said mobile station is configured to:

retrieve one or more user group identifiers from said smart card;

present said retrieved one or more user group identifiers on said output device;

accept a signal from said input device associated with a selected one or more of said presented one or more user group identifiers; and transmit a request for information associated with said selected one or more of said one or more user group identifiers, wherein said information associated with said one or more user groups is available to a user of said user group for previewing an established group call before said user engages in said established group call, and wherein said information associated with said selected one or more of said one or more user group identifiers includes at least a topic of said established group call that enables said user to preview a subject of said established group call before said user engages in said established group call.

24. The mobile station of claim 23, further configured to:

receive said requested information associated with said one or more user groups; and display said received information on said output device.

25. The mobile station of claim 24, wherein said received information includes one or more auxiliary information elements, and wherein said one or more auxiliary information elements are associated with at least one of: a number of active member terminals currently connected to said established group call, a user identity, an identity associated with each of said active member terminals currently connected to said established group call, a priority level of said established group call, a time since said established group call was initiated, an urgency level associated with unconnected members joining said established group call, a user group identifier associated with said established group call, and a user sub-group identifier associated with said established group call.

26. The mobile station of claim 23, wherein said mobile station is further configured to:

accept a signal from said input device associated with a selected one or more of said one or more user group identifiers based on said presented one or more user group identifiers; and transmit a signal to said system indicating that said mobile station is available to participate.

27. A mobile station in a system which supports group calls associated with a user group, said mobile station comprising:

an output device; and a receiver coupled to said output device, said receiver configured to:

receive an indication of an established group call transmitted over an air interface; and present said indication of said established group call using said output device, wherein said indication includes characterizing information that enables a user of said mobile station to preview said established group call before said user engages in said established group call, and wherein said characterizing information includes at least a topic of said established group call that enables said user to preview a subject of said established group call before said user engages in said established group call.

28. The mobile station of claim 27, wherein said output device is a display.

29. The mobile station of claim 27, wherein said output device is a speaker.

30. The mobile station of claim 27, wherein said output device is a vibrator.

31. The mobile station of claim 27, wherein said mobile station further comprises at least two output devices selected from the group consisting of: a display, a speaker, and a vibrator and wherein said output device is a selected one of said at least two devices.

32. The mobile station of claim 31, wherein said received indication further includes one or more auxiliary information elements, and wherein said one or more auxiliary information elements are associated with at least one of: a number of active member terminals currently connected to said established group call, a user identity, an identity associated with each of said active member terminals currently connected to said established group call, a priority level of said established group call, a time since said established group call was initiated, an urgency level associated with unconnected members joining said established group call, a user group identifier associated with said established group call, and a user sub-group identifier associated with said established group call.

33. The mobile station of claim 32, wherein said receiver is further configured to:

establish a relationship between said at least two output devices used to present said indication and said one or more auxiliary information elements; and present said indication on said at least two output devices based on said auxiliary information elements and said established relationship.

34. The mobile station of claim 32, wherein said receiver is further configured to:

enable a different one of said at least two output devices as said output device for presenting said indication based on a priority level of said active user group call.

35. The mobile station of claim 32 further comprising a memory device; wherein said receiver is further configured to store a mapping between said user group identifier and a user group text-based descriptor in said memory device.

36. The mobile station of claim 35, wherein said receiver is further configured to store a mapping between a sub-user group identifier and a sub-user group text-based descriptors.

37. The mobile station of claim 31, wherein said receiver is further configured to:

enable said at least two output devices to be used as said output device for presenting said indication.

38. The mobile station of claim 27, wherein said indication further includes a user group identification value associated with said established group call, and wherein said receiver is further configured to compare said received user group identification value with at least one user group identification value stored in said mobile station.

39. The mobile station of claim 38, wherein said at least one user group identification value is stored in a card removably coupled to said mobile station.

40. The mobile station of claim 38, further comprising an input device; and wherein said at least one user group identification value is entered by using said input device.

41. The mobile station of claim 38, further comprising a memory device; and wherein a user identification number is mapped to said at least one user group identification number in said memory device.

42. A group management system for managing a group call associated with a user group, said group management system comprising:

a radiocommunication system; and a control unit communicating with said radiocommunication system, said control unit configured to:

manage information associated with said user group; and manage one or more auxiliary information elements associated with said group call, said one or more information elements transmitted with an indication of an active group call associated with said user group by said radiocommunication system, wherein characterizing information associated with said one or more auxiliary information elements is made available to a user of said user group for previewing said active group call before said user engages in said active group call, and wherein said characterizing information includes at least a topic of said active group call that enables said user to preview a subject of said active group call before said user engages in said active group call.

43. The group management system of claim 42, wherein said one or more auxiliary information elements are associated with at least one of: a number of active member terminals currently connected to said established group call, a user identity, an identity associated with each of said active member terminals currently connected to said established group call, a priority level of said established group call, a time since said established group call was initiated, an urgency level associated with unconnected members joining said established group call, a user group identifier associated with said established group call, and a user sub-group identifier associated with said established group call.

44. The group management system of claim 43, wherein said control unit is further configured to:

determine an access priority level for a member terminal joining said active group call based on said priority level of said active group call.

45. The group management system of claim 42, wherein said one or more auxiliary information elements further includes a request for inactive member terminals associated with said user group to join said active group call.

46. The group management system of claim 42, wherein said one or more auxiliary information elements further includes one or more of: subject, location and status information associated with said active group call.

47. A group management system for managing a group call associated with a user group, said group management system comprising:

a radiocommunication system; and a control unit communicating with said radiocommunication system, said control unit configured to:

monitor said radiocommunication system when establishing a group call associated with said user group:

monitor an activity status of member terminals associated with one user group; and display said monitored information, wherein said monitored information includes one or more auxiliary information elements associated with said group call, wherein characterizing information associated with said one or more auxiliary information elements is made available for previewing said group call, and wherein said characterizing information includes at least a topic of said group call for previewing a subject of said group call.

48. The group management system of claim 47, wherein said monitored information includes information associated with all member terminals logged-in with said radiocommunication system.

49. The group management system of claim 47, wherein said monitored information includes information associated with all member terminals active in said group call.

50. The group management system of claim 47, wherein said monitored information includes information associated with all member terminals logged-in with said radiocommunication system within a certain area.

51. The group management system of claim 47, wherein said monitored information includes information associated with all member terminals active in said group call within a certain area.

52. The group management system of claim 47, wherein said control unit is further configured to poll a home location register to identify member terminals associated with said at least one user group that have recently logged-in to the radiocommunication system.

53. The group management system of claim 47, wherein said control unit is further configured to receive information from a home location register identifying member terminals associated with said at least one user group that have recently logged-in to said radiocommunication system.

54. A mobile station comprising:

a transceiver for transmitting and receiving radio signals; and an input device for selectively requesting information associated with established group calls;

wherein said transceiver is configured to read information received in response to a user's request;

transmit a request selected by said input device; and read information received in response to said user's request, wherein said received information is available to said user for previewing said established group calls before said user engages in said established group calls, and wherein said received information includes at least a topic of said established group calls that enables said user to preview a subject of said established group calls before said user engages in said established group calls.

55. The mobile station of claim 54, further comprising:

a display for displaying text identifiers of established group calls based on said received information.

56. The mobile station of claim 54, wherein said received information further includes names of participating members of said established group calls.

57. The mobile station of claim 54, wherein said transceiver is further configured to read said received information from a broadcast channel.

58. The mobile station of claim 54, wherein said transceiver is further configured to:

read a change flag on a paging channel; and selectively read a broadcast channel based on said change flag.

59. The mobile station of claim 54, wherein said transceiver is further configured to transmit said request in a message.

60. The mobile station of claim 59, wherein said message is addressed to a user group central management unit.

61. The mobile station of claim 59, further comprising:

a memory device for storing said received information, wherein said mobile station outputs said information in response to said request.

62. The mobile station of claim 61, wherein said mobile station first updates said received information in said memory prior to outputting said received information.

63. A method for communicating in a radiocommunication system comprising the steps of:

broadcasting characterizing information associated with established group calls on a first broadcast channel, wherein said characterizing information is available to a user for previewing said established group calls before said user engages in said established group calls, and wherein said characterizing information includes at least a topic of said established group calls that enables said user to preview a subject of said established group calls before said user engages in said established group calls; and broadcasting, on a second broadcast channel, a change flag associated with changes in said information associated with established group calls transmitted on said first broadcast channel.

64. The method of claim 63, wherein said first broadcast channel is a common broadcast channel (BCCH) and said second broadcast channel is a paging channel (PCH).

* * * * *